United States Patent
Yamashita et al.

(10) Patent No.: US 8,588,743 B2
(45) Date of Patent: Nov. 19, 2013

(54) COMMUNICATION DEVICE AND COMMUNICATION SYSTEM

(75) Inventors: Hiroyoshi Yamashita, Kawasaki (JP); Hiroyuki Fujiyama, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1110 days.

(21) Appl. No.: 11/798,304

(22) Filed: May 11, 2007

(65) Prior Publication Data

US 2008/0064368 A1    Mar. 13, 2008

(30) Foreign Application Priority Data

Aug. 11, 2006    (JP) ................................. 2006-220320

(51) Int. Cl.
*H04M 1/66*    (2006.01)
(52) U.S. Cl.
USPC ........... 455/411; 380/249; 380/259; 380/270; 380/281
(58) Field of Classification Search
USPC ........... 370/345; 455/307, 410, 411; 380/249, 380/259, 270, 281
See application file for complete search history.

(56) References Cited

U.S. PATENT DOCUMENTS

| | | | | |
|---|---|---|---|---|
| 5,694,392 | A * | 12/1997 | Gaglione et al. | 370/337 |
| 6,456,191 | B1 * | 9/2002 | Federman | 340/10.2 |
| 7,194,556 | B2 * | 3/2007 | Rajagopal et al. | 709/248 |
| 2005/0042999 | A1 * | 2/2005 | Rappaport | 455/307 |
| 2005/0058116 | A1 * | 3/2005 | Palin et al. | 370/345 |
| 2007/0162958 | A1 * | 7/2007 | Kao et al. | 726/4 |

FOREIGN PATENT DOCUMENTS

| | | |
|---|---|---|
| JP | 02-013026 | 1/1990 |
| JP | 06-276180 | 9/1994 |
| JP | 7-303111 A | 11/1995 |
| JP | 2002-508621 A | 3/2002 |
| JP | 2005-321924 A | 11/2005 |
| WO | WO-99/49597 A1 | 9/1999 |

OTHER PUBLICATIONS

Japanese Office Action, Partial English-language Translation, mailed Feb. 22, 2011 for corresponding Japanese Application No. 2006-220320.

* cited by examiner

*Primary Examiner* — Temica M Beamer
(74) *Attorney, Agent, or Firm* — Fujitsu Patent Center (57) ABSTRACT

A communication device capable of preventing interference due to collision of signals of a plurality of communication devices (slaves) is provided. The communication device characterized by having a receiving part which receives a request signal by radio, a counter which starts count of a count value on reception of the request signal, a comparing part which compares the count value and a comparison value, and a transmitting part which transmits an acknowledge signal by radio in accordance with a result of the comparison is provided.

19 Claims, 6 Drawing Sheets

COMMUNICATION DEVICE AND COMMUNICATION SYSTEM

CROSS-REFERENCE TO RELATED APPLICATIONS

This application is based upon and claims the benefit of priority from the prior Japanese Patent Application No. 2006-220320, filed on Aug. 11, 2006, the entire contents of which are incorporated herein by reference.

BACKGROUND OF THE INVENTION

1. Field of the Invention

The present invention relates to a communication device and a communication system, and particularly relates to a communication device and a communication system which perform radio communication.

2. Description of the Related Art

When communication devices with a plurality of IDs are present on the occasion of performing ID (identifier) authentication using radio, there is the problem that collision of signals occurs and ID authentication is not accurately performed. Since the frequency bands for use in UWB (ultra wide band) communication that is a very high speed radio technology exceeding an optical fiber, the fourth generation cellular phones which are expected to be in actual use in 2010 and the like partially overlap one another, and the fear of interference is not avoided.

Japanese Patent Application Laid-open No. 6-276180 discloses a wireless transmitter-receiver that includes a controller which instructs an operation to tools remotely installed, a transmitting and receiving device which converts mutual information of the above described tools and the above described controller into wireless signals and communicates them, an ID cord storing device which stores ID cords provided for identification of the tools, and a timer generator which generates a timer in accordance with the above described ID cords, and provides time lags by the above described timer generator when the wireless signals collide with each other to retransmit the wireless signals.

When the communication devices with a plurality of IDs are present on the occasion of performing ID authentication using radio as described above, there is the problem that collision of signals occurs and ID authentication is not accurately performed.

SUMMARY OF THE INVENTION

An object of the present invention is to provide a communication device and a communication system capable of preventing interference caused by collision of signals of a plurality of communication devices (slaves).

According to one aspect of the present invention, a communication device characterized by having a receiving part which receives a request signal by radio, a counter which starts count of a count value on reception of the request signal, a comparing part which compares the count value and a comparison value, and a transmitting part which transmits an acknowledge signal by radio in accordance with a result of the comparison is provided.

According to another aspect of the present invention, a communication system characterized by having a plurality of slaves, and characterized in that each of the slaves comprises a receiving part which receives by radio the same request signal transmitted from a master by radio, and a transmitting part which transmits an acknowledge signal to the master in a different timing among the above described slaves by radio after reception of the request signal, is provided.

DETAILED DESCRIPTION OF THE PREFERRED EMBODIMENTS

First Embodiment

Figure 1:
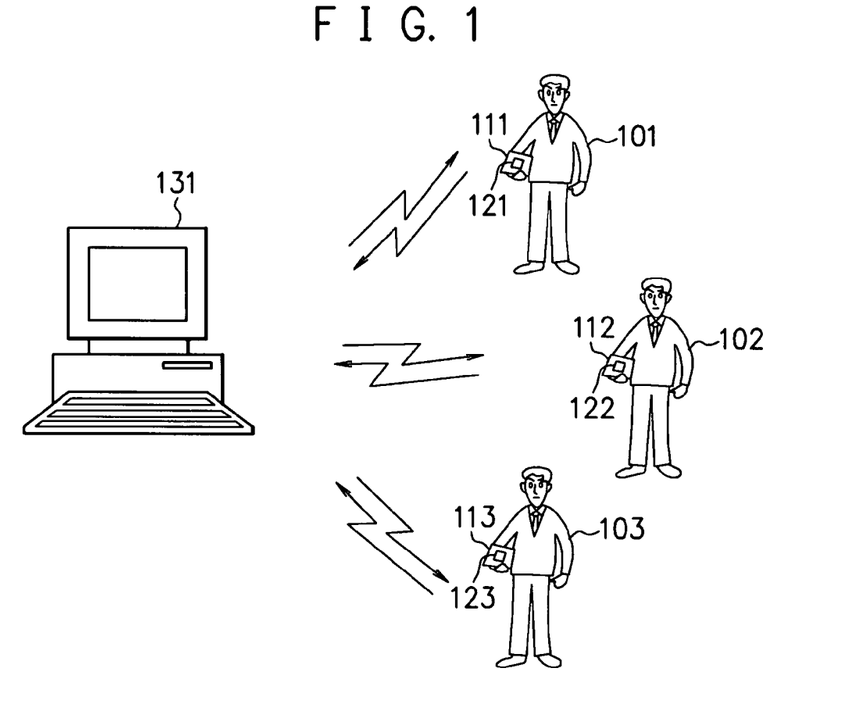
FIG. 1 is a view showing a configuration example of a communication system according to the first embodiment of the present invention.

FIG. 1 is a view showing a configuration example of a communication system according to a first embodiment of the present invention. A first user 101 has a first slave device (hereinafter, called a slave) 111. The first slave 111 has a first communication device 121. Similarly, a second user 102 has a second slave 112, and the second slave 112 has a second communication device 122. A third user 103 has a third slave 113, and the third slave 113 has a third communication device 123.

A master device (hereinafter, called a master) 131 is, for example, a personal computer. The slaves 111 to 113 are, for example, cellular phones, IC cards, ID (identifier) cards or the like. The master 131 and the communication devices 121 to 123 in the slaves 111 to 113 can perform radio communication such as, for example, UWB (ultra wide band) communication, communication of the fourth generation cellular phones or the like. The master 131 can perform radio communication with the slaves 111 to 113. Each of the slaves 111 to 113 can perform radio communication with the master 131.

The communication device 121 in the first slave 111 stores its own ID (identifier) of "0001b", for example. Here, "b" at the last digit of the number means binary number expression. The communication device 122 in the second slave 112 stores its own ID of "0011b", for example. The communication device 123 in the third slave 113 stores its own ID of "0101b", for example.

The slaves 111 to 113 are movable by the users 101 to 103. The master 131 is capable of radio communication with the slaves 111 to 113 which exist in a communication area around the master 131. The slaves 111 to 113 are capable of radio communication with the master 131 when they are located in the above described communication area, and cannot communicate with the master 131 when they are located outside the above described communication area.

The master 131 can perform data communication with only the slave having ID that is registered in advance among the slaves 111 to 113. For example, only the ID of the slave 113 is registered in the master 131, and the IDs of the slaves 111 and 112 are not registered. The master 131 performs ID authentication of the slaves 111 to 113, and succeeds in ID authentication of the slave 113, but fails in ID authentication of the slaves 111 and 112. Thereby, only the slave 113 is allowed to perform data communication with the master 131. Thereafter, only the slave 113 can perform data communication with the master 131, and the slaves 111 and 112 cannot perform data communication with the master 131.

The processing of performing ID authentication between the master 131 and the slaves 111 to 113 will be described. The master 131 transmits a request signal by radio by broadcasting. When the slaves 111 to 113 receive the request signal, they transmit acknowledge signals including their own IDs to the master 131 for ID authentication. When the three slaves 111 to 113 are located in the communication area of the master 131, the three slaves 111 to 113 simultaneously transmit the acknowledge signals, and the acknowledge signals collide with one another to cause interference. In this embodiment, interference is prevented by shifting timings in which the slaves 111 to 113 transmit the acknowledge signals.

Figure 2:
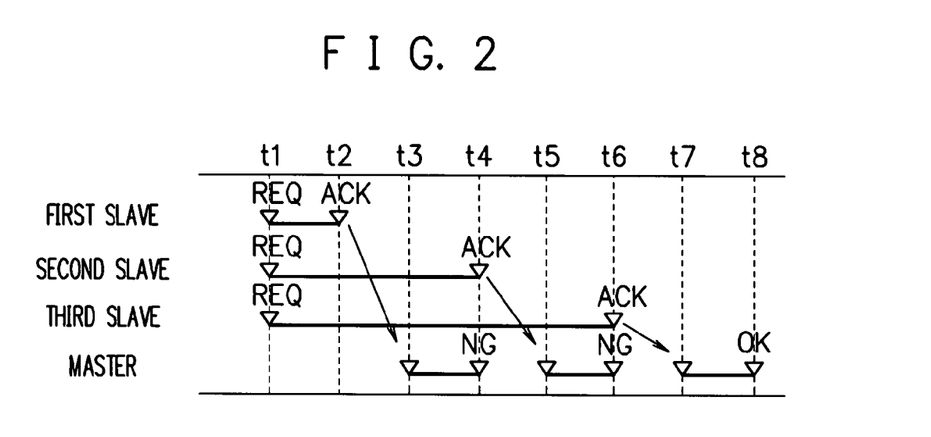
FIG. 2 is a timing chart showing a first processing example of the communication system according to the first embodiment.

FIG. 2 is a timing chart showing a first processing example of the communication system according to this embodiment. The first processing example shows the example in which the three slaves 111 to 113 simultaneously receive a request signal REQ.

The master 131 transmits the request signal REQ by radio by broadcasting. At a time t1, the first to the third sleeves 111 to 113 receive the request signal REQ by radio. Next, at a time t2, the first slave 111 transmits an acknowledge signal ACK including its own ID to the master 131 in response to the request signal REQ. Next, at a time t3, the master 131 receives the acknowledge signal ACK from the first slave 111, and performs authentication processing of the ID in the acknowledge signal ACK. The ID of the first slave 111 is not registered in the master 131, and therefore, the master 131 obtains the result of ID authentication failure. Next, at a time t4, the master 131 performs processing of ID authentication failure.

At the time t4, the second slave 112 transmits an acknowledge signal ACK including its own ID to the master 131 in response to the request signal REQ. Next, at a time t5, the master 131 receives the acknowledge signal ACK from the second slave 112, and performs authentication processing of the ID in the acknowledge signal ACK. The ID of the second slave 112 is not registered in the master 131, and therefore, the master 131 obtains the result of ID authentication failure. Next, at a time t6, the master 131 performs processing of ID authentication failure.

At the time t6, the third slave 113 transmits an acknowledge signal ACK including its own ID to the master 131 in response to the request signal REQ. Next, at a time t7, the master 131 receives the acknowledge signal ACK from the third slave 113, and performs authentic processing of the ID in the acknowledge signal ACK. The ID of the third slave 113 is registered in the master 131, and therefore, the master 131 obtains the result of ID authentication success. Next, at a time t8, the master 131 performs processing of ID authentication success. For example, the master 131 allocates a communication channel to the third slave 113. Thereafter, the master 131 and the third slave 113 perform data communication with each other.

As described above, even if the first to the third slaves 111 to 113 simultaneously receive the request signals REQ from the master 131 at the time t1, they transmit the acknowledge signals ACK at the different times t2, t4 and t6, and therefore, interference can be prevented.

Figure 3:
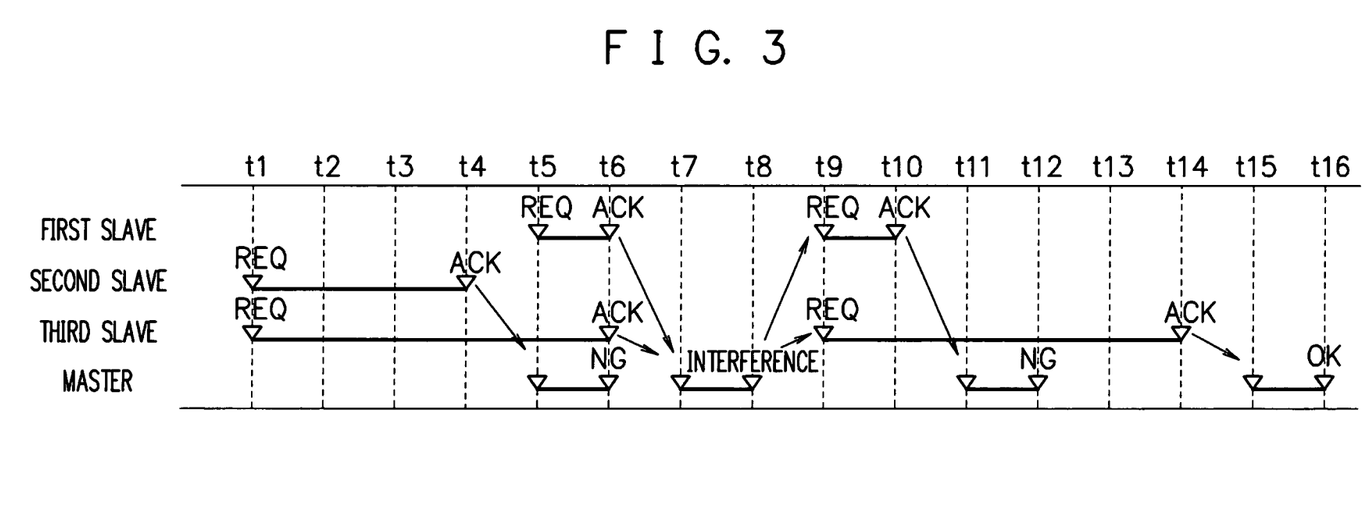
FIG. 3 is a timing chart showing a second processing example of the communication system according to the first embodiment.

FIG. 3 is a timing chart showing a second processing example of the communication system according to this embodiment. The second processing example shows an example in which interference is caused because one slave 111 enters the communication area partway.

The master 131 transmits the request signal REQ by broadcasting by radio. On this occasion, only the second slave 112 and the third slave 113 are assumed to exist in the communication area. The first slave 111 is located outside the communication area. At the time t1, the second and the third slaves 112 and 113 receive the request signal REQ by radio. Next, at the time t4, the second slave 111 transmits the acknowledge signal ACK including its own ID to the master 131 in response to the request signal REQ. Next, at the time t5, the master 131 receives the acknowledge signal ACK from the second slave 112, and performs authentication processing of the ID in the acknowledge signal ACK. Since the ID of the second slave 112 is not registered in the master 131, the master 131 obtains the result of ID authentication failure. Next, at the time t6, the master 131 performs the processing of ID authentication failure.

At the time t5, the first slave 111 is assumed to move into the communication area. The first slave 111 receives the request signal REQ from the master 131 by radio. Next, at the time t6, the first slave 111 transmits the acknowledge signal ACK including its own ID to the master 131 in response to the request signal REQ. At the time t6, the third slave 113 transmits the acknowledge signal ACK including its own ID to the master 131 in response to the request signal REQ. Namely, at the time t6, the first and the third slaves 111 and 113 simultaneously transmit the acknowledge signals ACK.

Next, at the time t7, the master 131 simultaneously receives the acknowledge signals ACK from the first and the third slaves 111 and 113, and recognizes that it cannot perform ID authentication due to interference. Next, at the time t8, the master 131 transmits a retransmission request signal REQ by radio due to interference.

Next, at a time t9, the first and the third slaves 111 and 113 receive the retransmission request signal REQ by radio. Next, at a time t10, the first slave 111 transmits the acknowledge signal ACK including its own ID to the master 131 in response to the request signal REQ. Next, at a time t11, the master 131 receives the acknowledge signal ACK from the first slave 111, and performs authentication processing of the ID in the acknowledge signal ACK. Since the ID of the first slave 111 is not registered in the master 131, the master 131 obtains the result of ID authentication failure. Next, at a time t12, the master 131 performs the processing of ID authentication failure.

Next, at a time t14, the third slave 113 transmits the acknowledge signal ACK including its own ID to the master 131 in response to the request signal REQ. Next, at a time t15, the master 131 receives the acknowledge signal ACK from the third slave 113, and performs authentication processing of the ID in the acknowledge signal ACK. Since the ID of the third slave 113 is registered in the master 131, the master 131 obtains the result of ID authentication success. Next, at a time t16, the master 131 performs the processing of ID authentication success. For example, the master 131 allocates a communication channel to the third slave 113. Thereafter, the master 131 and the third slave 113 perform data communication with each other.

As above, even when interference occurs because the first slave 111 moves into the communication area during ID authentication of the second and the third slaves 112 and 113, the first to the third slaves 111 to 113 transmit the acknowledge signals ACK in different timings, and therefore, subsequent interference can be prevented.

Figure 4:
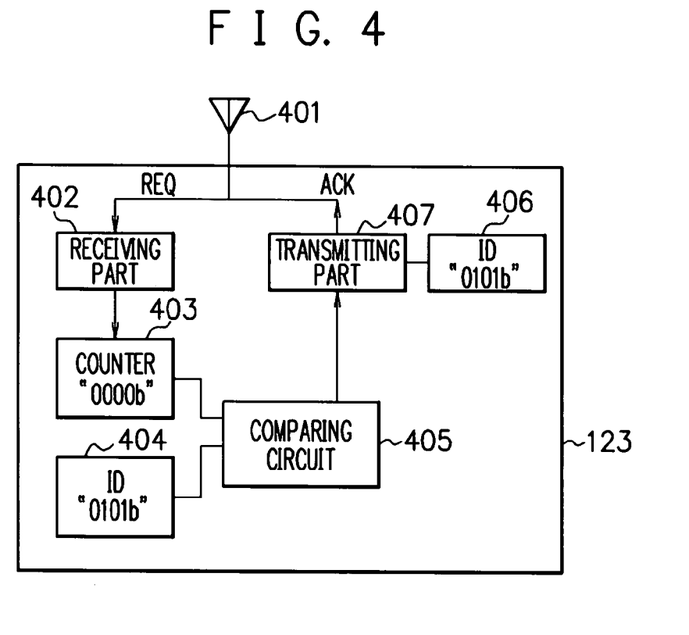
FIG. 4 is a diagram showing a configuration example of a communication device in a third slave according to the first embodiment.

FIG. 4 shows a diagram showing a configuration example of the communication device 123 in the third slave 113. A receiving part 402 receives the request signal REQ from the master 131 by radio through an antenna 401. When the receiving part 402 receives the request signal REQ, a counter 403 starts to count a count value. The initial value of the counter 403 is "0000b", and the counter 403 is a timer which performs count corresponding to the lapse of time. ID storing parts 404 and 406 store the ID of its own slave 113 or communication device 123. The ID of the slave 113 or the communication device 123 is, for example, "0101b". A comparing circuit (comparing part) 405 compares the count value of the counter 403 and the ID stored in the ID storing part 404, and outputs a coincidence signal to a transmitting part 407 when both of them coincide with each other. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 only differ from the communication device 123 in the third slave 113 in the IDs stored in the ID storing parts 404 and 406. In the communication device 121 in the first slave 111, the ID storing parts 404 and 406 store the ID of its own slave 111 or communication device 121. The ID of the slave 111 or the communication device 121 is, for example, "0001b". In the communication device 122 in the second slave 112, the ID storing parts 404 and 406 store the ID of its own slave 112 or communication device 122. The ID of the slave 112 or the communication device 122 is, for example, "0011b".

When the counter 403 counts "0001b (1 in decimal number)", the comparing circuit 405 outputs a coincidence signal, and the transmitting part 407 transmits the acknowledge signal ACK, in the communication device 121 in the first slave 111. Namely, the communication device 121 in the first slave 111 transmits the acknowledge signal ACK at the first cycle after receiving the request signal REQ as shown in FIGS. 2 and 3.

When the counter 403 counts "0011b (3 in decimal number)", the comparing circuit 405 outputs a coincidence signal, and the transmitting part 407 transmits the acknowledge signal ACK, in the communication device 122 in the second slave 112. Namely, the communication device 122 in the second slave 112 transmits the acknowledge signal ACK at the third cycle after receiving the request signal REQ as shown in FIGS. 2 and 3.

When the counter 403 counts "0101b (5 in decimal number)", the comparing circuit 405 outputs a coincidence signal, and the transmitting part 407 transmits the acknowledge signal ACK, in the communication device 123 in the second slave 113. Namely, the communication device 123 in the third slave 113 transmits the acknowledge signal ACK at the fifth cycle after receiving the request signal REQ, as shown in FIGS. 2 and 3.

As above, the first slave 111 transmits the acknowledge signal ACK at the first cycle, the second slave 112 transmits the acknowledge signal ACK at the third cycle, and the third slave 113 transmits the acknowledge signal ACK at the fifth cycle. Since the first to the third slaves 111 to 113 transmit the acknowledge signals ACK in the different timings after receiving the same request signal REQ, interference of the acknowledge signals ACK can be prevented.

It should be noted that the ID storing part 404 does not need to store the entire ID, but may store part of the ID. For example, when the ID has more than four figures, the ID storing part 404 may store four low order digits of the ID.

Second Embodiment

Figure 5:
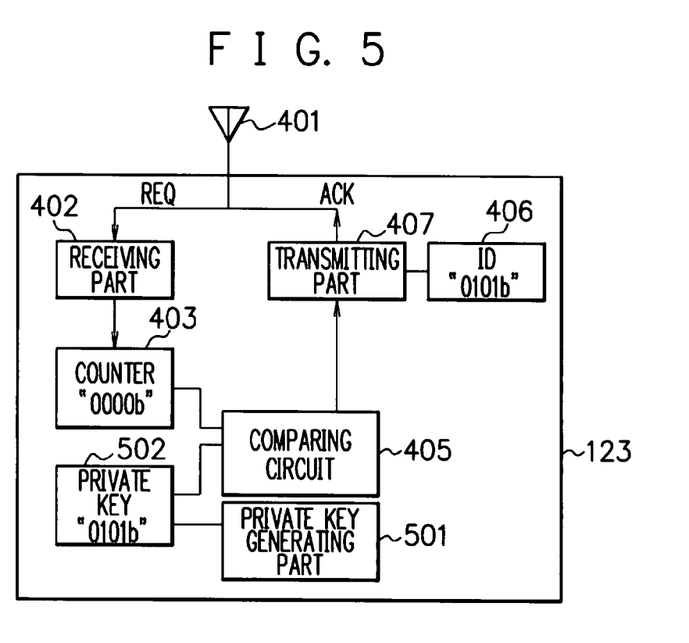
FIG. 5 is a diagram showing a configuration example of a communication device in a third slave according to the second embodiment.

FIG. 5 shows a configuration example of the communication device 123 in the third slave 113 according to a second embodiment of the present invention. In this embodiment (FIG. 5), the ID storing part 404 is deleted, and a private key generating part 501 and a private key storing part 502 are added in contrast to the first embodiment (FIG. 4). The respect in which this embodiment differs from the first embodiment will be described hereinafter. The private key generating part 501 generates a private key. The private key storing part 502 stores the generated private key. The private key of the third slave 113 is, for example, "0101b". The private key does not have to be the same as the ID stored in the ID storing part 406. The private key generating part (private key changing part) 501 can change the private key stored in the private key storing part 502. The comparing circuit (comparing part) 405 compares the count value of the counter 403 and the private key stored in the private key storing part 502, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the private keys stored in the private key storing parts 502. For example, the private key stored in the private key storing part 502 in the first slave 111 is "0001b", the private key stored in the private key storing part 502 in the second slave 112 is "0011b", and the private key stored in the private key storing part 502 in the third slave 113 is "0101b".

In the communication device 121 in the first slave 111, when the counter 403 counts "0001b (1 in decimal number)", the comparing circuit 405 outputs a coincidence signal, and the transmitting part 407 transmits the acknowledge signal ACK. Namely, the communication device 121 in the first slave 111 transmits the acknowledge signal ACK at the first cycle after receiving the request signal REQ as shown in FIGS. 2 and 3.

In the communication device 122 in the second slave 112, when the counter 403 counts "0011b (3 in decimal number)", the comparing circuit 405 outputs a coincidence signal, and the transmitting part 407 transmits the acknowledge signal ACK. Namely, the communication device 122 in the second slave 112 transmits the acknowledge signal ACK at the third cycle after receiving the request signal REQ as shown in FIGS. 2 and 3.

In the communication device 123 in the third slave 113, when the counter 403 counts "0101b (5 in decimal number)", the comparing circuit 405 outputs a coincidence signal, and the transmitting part 407 transmits the acknowledge signal ACK. Namely, the communication device 123 in the third slave 113 transmits the acknowledge signal ACK at the fifth cycle after receiving the request signal REQ as shown in FIGS. 2 and 3.

As above, the first slave 111 transmits the acknowledge signal ACK at the first cycle, the second slave 112 transmits the acknowledge signal ACK at the third cycle, and the third slave 113 transmits the acknowledge signal ACK at the fifth cycle. Since the first to the third slaves 111 to 113 transmit the acknowledge signal ACK in different timings after receiving the same request signal REQ, interference of the acknowledge signals can be prevented.

Third Embodiment

Figure 6:
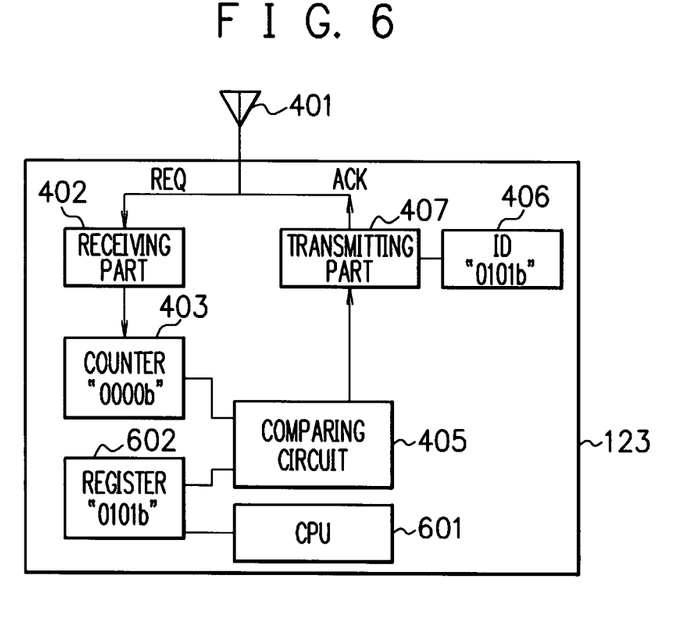
FIG. 6 is a diagram showing a configuration example of a communication device in a third slave according to the third embodiment.

FIG. 6 is view showing a configuration example of the communication device 123 in the third slave 113 according to a third embodiment of the present invention. In this embodiment (FIG. 6), the ID storing part 404 is deleted, and a CPU 601 and a register 602 are added in contrast to the first embodiment (FIG. 4). The respect in which this embodiment differs from the first embodiment will be described hereinafter. The CPU (changing part) 601 can change a register value stored in the register 601. The value of the register 601 of the third slave 113 is, for example, "0101b". The register value does not have to be the same as the ID stored in the ID storing part 406. The comparing circuit (comparing part) 405 compares the count value of the counter 403 and the register value stored in the register 602, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the register values stored in the register 602. For example, the register value stored in the register 602 in the first slave 111 is "0001b", the register value stored in the register 602 in the second slave 112 is "0011b", and the register value stored in the register 602 in the third slave 113 is "0101b".

In the communication device 121 in the first slave 111, when the counter 403 counts "0001b (1 in decimal number)", the comparing circuit 405 outputs a coincidence signal, and the transmitting part 407 transmits the acknowledge signal ACK. Namely, the communication device 121 in the first slave 111 transmits the acknowledge signal ACK at the first cycle after receiving the request signal REQ as shown in FIGS. 2 and 3.

In the communication device 122 in the second slave 112, when the counter 403 counts "0011b (3 in decimal number)", the comparing circuit 405 outputs a coincidence signal, and the transmitting part 407 transmits the acknowledge signal ACK. Namely, the communication device 122 in the second slave 112 transmits the acknowledge signal ACK at the third cycle after receiving the request signal REQ as shown in FIGS. 2 and 3.

In the communication device 123 in the third slave 113, when the counter 403 counts "0101b (5 in decimal number)", the comparing circuit 405 outputs a coincidence signal, and the transmitting part 407 transmits the acknowledge signal ACK. Namely, the communication device 123 in the third slave 113 transmits the acknowledge signal ACK at the fifth cycle after receiving the request signal REQ as shown in FIGS. 2 and 3.

As above, the first slave 111 transmits the acknowledge signal ACK at the first cycle, the second slave 112 transmits the acknowledge signal ACK at the third cycle, and the third slave 113 transmits the acknowledge signal ACK at the fifth cycle. Since the first to the third slaves 111 to 113 transmit the acknowledge signals ACK in the different timings after receiving the same request signal REQ, interference of the acknowledge signals ACK can be prevented.

Fourth Embodiment

Figure 7:
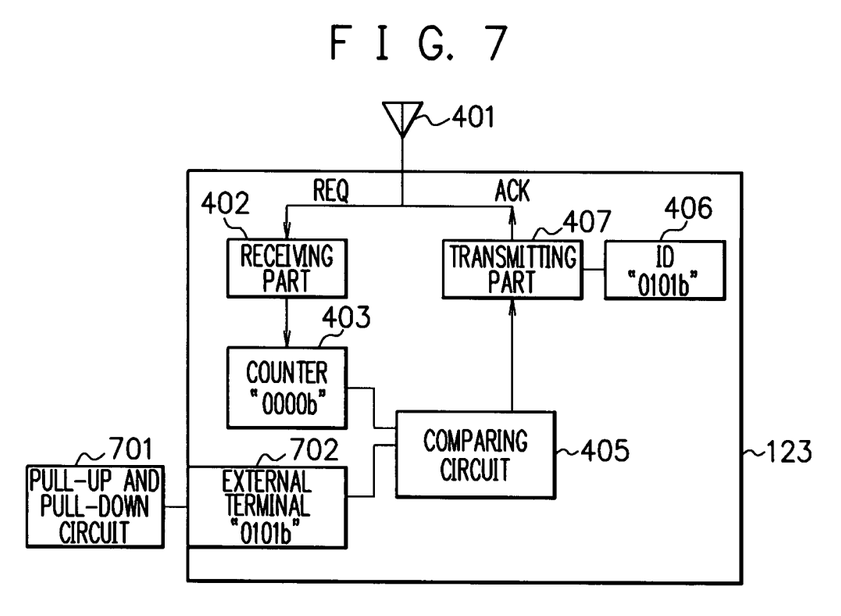
FIG. 7 is a diagram showing a configuration example of a communication device in a third slave according to the fourth embodiment.

FIG. 7 is a view showing a configuration example of the communication device 123 in the third slave 113 according to a fourth embodiment of the present invention. In this embodiment (FIG. 7), the ID storing part 404 is deleted, and an external terminal 702 is added in contrast to the first embodiment (FIG. 4). The respect in which this embodiment differs from the first embodiment will be described hereinafter. The external terminal 702 of the communication device 123 inputs therein an external signal from an external pull-up and pull-down circuit 701. The external signal value of the external terminal 702 of the third slave 113 is, for example, "0101b". The external signal value does not have to be the same as the ID stored in the ID storing part 406. The comparing circuit (comparing part) 405 compares the count value of the counter 403 and the external signal value inputted in the external terminal 702, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the external signal values inputted into the external terminals 702. For example, the external signal value which is inputted in the external terminal 702 in the first slave 111 is "0001b", the external signal value which is inputted in the external terminal 702 in the second slave 112 is "0011b", and the external signal value which is inputted in the external terminal 702 in the third slave 113 is "0101b".

In the communication device 121 in the first slave 111, when the counter 403 counts "0001b (1 in decimal number)", the comparing circuit 405 outputs a coincidence signal, and the transmitting part 407 transmits the acknowledge signal ACK. Namely, the communication device 121 in the first slave 111 transmits the acknowledge signal ACK at the first cycle after receiving the request signal REQ as shown in FIGS. 2 and 3.

In the communication device 122 in the second slave 112, when the counter 403 counts "0011b (3 in decimal number)", the comparing circuit 405 outputs a coincidence signal, and the transmitting part 407 transmits the acknowledge signal ACK. Namely, the communication device 122 in the second slave 112 transmits the acknowledge signal ACK at the third cycle after receiving the request signal REQ as shown in FIGS. 2 and 3.

In the communication device 123 in the third slave 113, when the counter 403 counts "0101b (5 in decimal number)", the comparing circuit 405 outputs a coincidence signal, and the transmitting part 407 transmits the acknowledge signal ACK. Namely, the communication device 123 in the third slave 113 transmits the acknowledge signal ACK at the fifth cycle after receiving the request signal REQ as shown in FIGS. 2 and 3.

As above, the first slave 111 transmits the acknowledge signal ACK at the first cycle, the second slave 112 transmits the acknowledge signal ACK at the third cycle, and the third slave 113 transmits the acknowledge signal ACK at the fifth cycle. Since the first to the third slaves 111 to 113 transmit the acknowledge signals ACK in the different timings after receiving the same request signal REQ, interference of the acknowledge signals ACK can be prevented.

Fifth Embodiment

Figure 8:
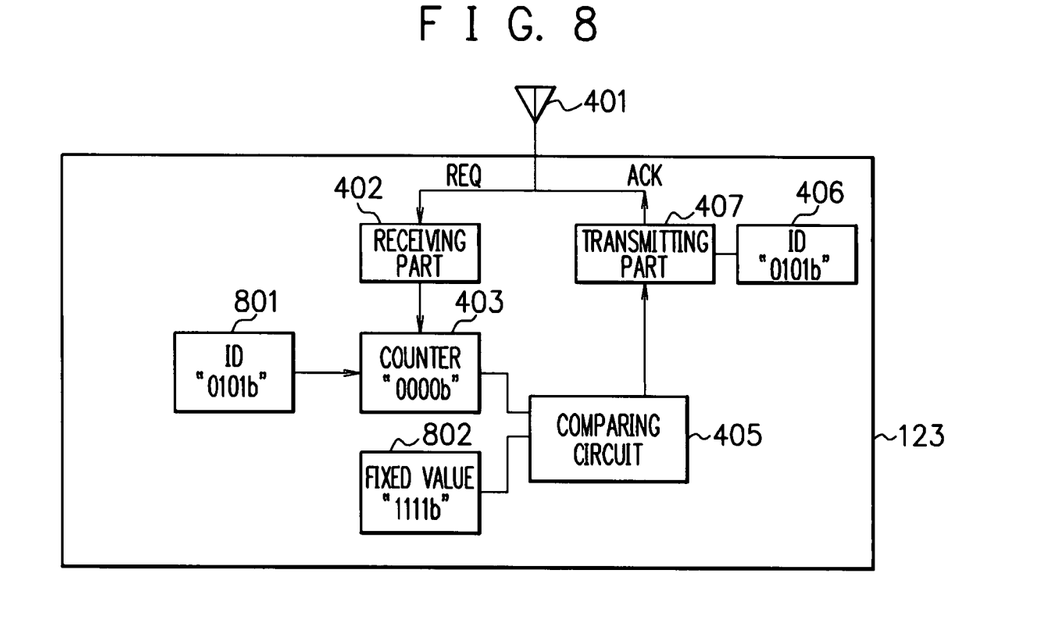
FIG. 8 is a diagram showing a configuration example of a communication device in a third slave according to the fifth embodiment.

FIG. 8 is a view showing a configuration example of the communication device 123 in the third slave 113 according to a fifth embodiment of the present invention. In this embodiment (FIG. 8), the ID storing part 404 is deleted, and an ID storing part 810 and a fixed value storing part 802 are added in contrast to the first embodiment (FIG. 4). The respect in which this embodiment differs from the first embodiment will be described hereinafter. The fixed value storing part 802 stores a fixed value. The fixed value is, for example, "1111b". The ID storing part 801 stores the ID of its own slave 113 or communication device 123. The ID is, for example, "0101b". The counter 403 performs count at a cycle corresponding to the ID stored in the ID storing part 801. The comparing circuit (comparing part) 405 compares the count value of the counter 403 and the fixed value stored in the fixed value storing part 802, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the IDs stored in the ID storing parts 801. For example, the ID stored in the ID storing part 801 in the first slave 111 is "0001b", the ID stored in the ID storing part 801 in the second slave 112 is "0011b", and the ID stored in the ID storing part 801 in the third slave 113 is "0101b".

In the first slave 111, when the counter 403 inputs therein the ID of "0001b", it performs count in synchronism with the clock at, for example, a frequency of 5 MHz, and when the counter 403 counts the fixed value "1111b", the comparing circuit 405 outputs a coincidence signal, and the transmitting part 407 transmits the acknowledge signal ACK.

In the second slave 112, when the counter 403 inputs therein the ID of "0011b", it performs count in synchronism with the clock at, for example, a frequency of 3 MHz, and when the counter 403 counts the fixed value "1111b", the comparing circuit 405 outputs a coincidence signal, and the transmitting part 407 transmits the acknowledge signal ACK.

In the third slave 113, when the counter 403 inputs therein the ID of "0101b", it performs count in synchronism with the clock at, for example, a frequency of 1 MHz, and when the counter 403 counts the fixed value "1111b", the comparing circuit 405 outputs a coincidence signal, and the transmitting part 407 transmits the acknowledge signal ACK.

As above, the comparing circuit 405 performs count at a cycle (frequency) corresponding to the ID stored in the ID storing part 801. The communication device 121 in the first slave 111 transmits the acknowledge signal ACK a short time (5 MHz) later after receiving the request signal REQ. The communication device 122 in the second slave 112 transmits the acknowledge signal ACK a medium time (3 MHz) later after receiving the request signal REQ. The communication device 123 in the third slave 113 transmits the acknowledge signal ACK a long time layer (1 MHz) after receiving the request signal REQ. Since the first to the third slaves 111 to 113 transmit the acknowledge signals ACK in the different timings after receiving the same request signal REQ, interference of the acknowledge signals ACK can be prevented.

Sixth Embodiment

Figure 9:
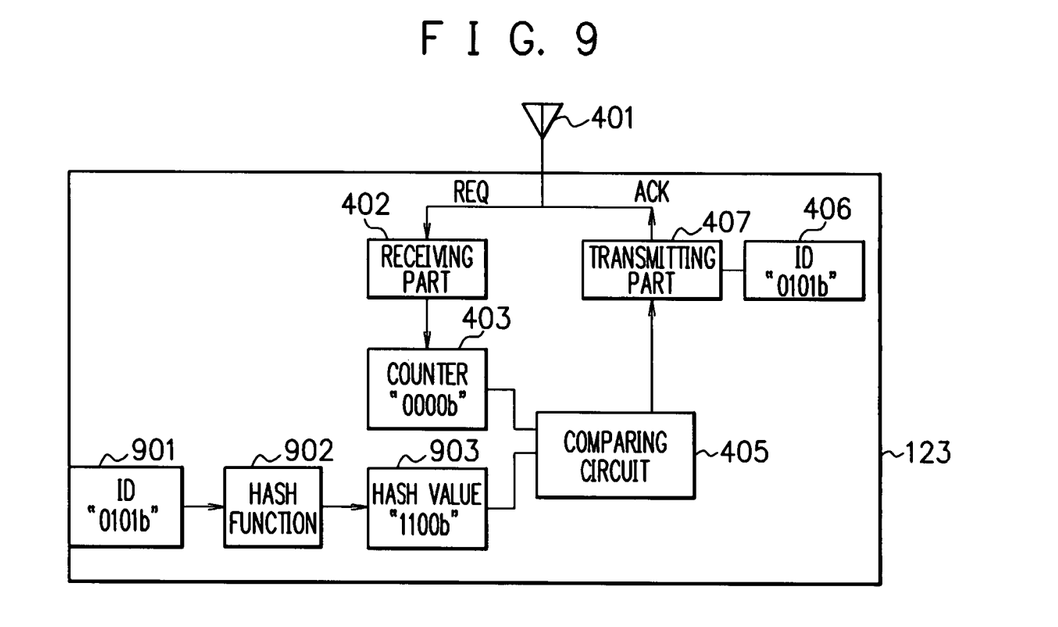
FIG. 9 is a diagram showing a configuration example of a communication device in a third slave according to the sixth embodiment.

FIG. 9 is a view showing a configuration example of the communication device 123 in the third slave 113 according to a sixth embodiment of the present invention. In this embodiment (FIG. 9), the ID storing part 404 is deleted, and an ID storing part 901, a hash function part 902 and a hash value storing part 903 are added in contrast to the first embodiment (FIG. 4). The respect in which this embodiment differs from the first embodiment will be described hereinafter. The ID storing part 901 stores the ID of its own slave 113 or communication device 123. The ID is, for example, "0101b". The hash function part 902 outputs a hash value according to the hash function based on the ID stored in the ID storing part 901. The hash value storing part 903 stores the hash value. The hash function part 902 inputs therein, for example, the ID "0101b", and outputs the hash value "1100b". The hash function is an irreversible one-way function, and converts the ID into a hash value of a pseudo random number. Conversely, the ID cannot be reproduced from the hash value. The comparing circuit (comparing part) 405 compares the count value of the counter 403 and the hash value stored in the hash value storing part 903, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the IDs stored in the ID storing part 901. For example, the ID stored in the ID storing part 901 in the first slave 111 is "0001b", the ID stored in the ID storing part 901 in the second slave 112 is "0011b", and the ID stored in the ID storing part 901 in the third slave 113 is "0101b". As a result, the hash values differing from one another are stored in the hash value storing parts 903 in the first to the third slaves 111 to 113.

In the communication device 121 in the first slave 111, when the counter 403 counts the hash value of the ID "0001b", the comparing circuit 405 outputs a coincidence signal, and the transmitting part 407 transmits the acknowledge signal ACK.

In the communication device 122 in the second slave 112, when the counter 403 counts the hash value of the ID "0011b", the comparing circuit 405 outputs a coincidence signal, and the transmitting part 407 transmits the acknowledge signal ACK.

In the communication device 123 in the third slave 113, when the counter 403 counts the hash value of the ID "0101b", the comparing circuit 405 outputs a coincidence signal, and the transmitting part 407 transmits the acknowledge signal ACK.

Thereby, the first to the third slaves 111 to 113 can transmit the acknowledge signal ACK in different timings after receiving the same request signal REQ, and can prevent interference of the acknowledge signals ACK.

Seventh Embodiment

Figure 10:
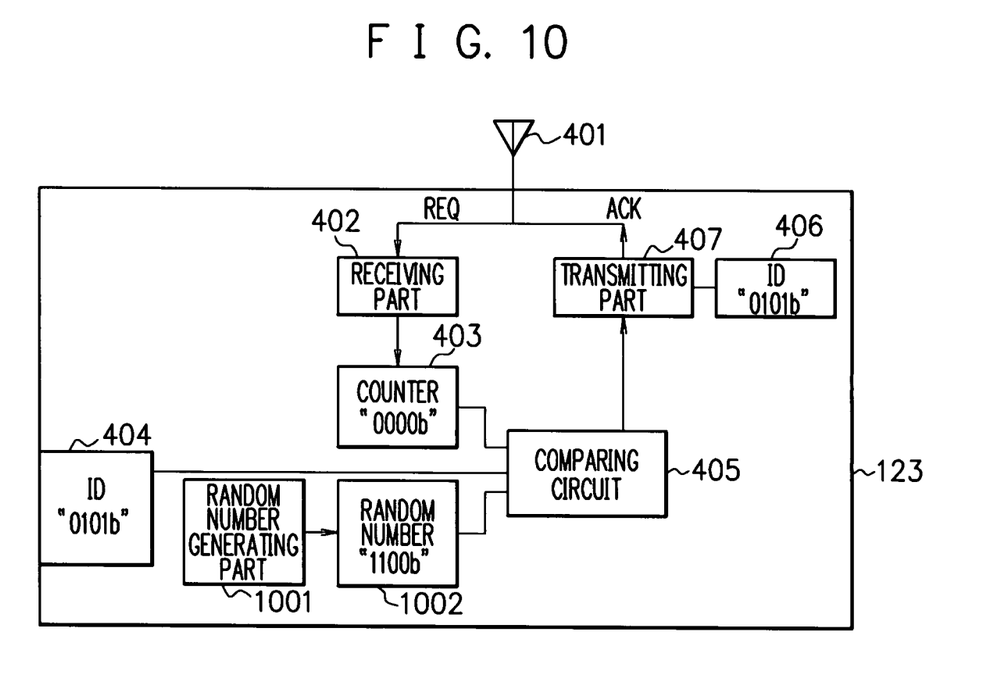
FIG. 10 is a diagram showing a configuration example of a communication device in a third slave according to the seventh embodiment.

FIG. 10 is a view showing a configuration example of the communication device 123 in the third slave 113 according to a seventh embodiment of the present invention. In this embodiment (FIG. 10), a random number generating part 1001 and a random number storing part 1002 are added in contrast to the first embodiment (FIG. 4). The respect in which this embodiment differs from the first embodiment will be described hereinafter. The random number generating part 1001 generates a random number. The random number storing part 1002 stores the random number. The random number is, for example, "1100b".

When the receiving part 402 receives the request signal REQ from the master 131 through the antenna 401 by radio, the transmitting part 407 transmits the acknowledge signal ACK to the master 131 through the antenna 401 by the same processing as in the first embodiment. Namely, the comparing circuit 405 compares the count value of the counter 403 and the ID stored in the ID storing part 404.

For example, when the ID storing part 404 stores part of the ID stored in the ID storing part 406, there is the possibility of the same values are stored in the ID storing parts 404 in a plurality of slaves 111 to 113. In this case, the acknowledge signals ACK of a plurality of slaves 111 to 113 interfere with each other. At this time, as shown in the time t8 in FIG. 3, the master 131 transmits the retransmission request signal REQ by radio.

When the receiving part 402 receives the retransmission request signal REQ from the master 131 by radio through the antenna 401, the counter 403 starts count of the count value. The initial value of the counter 403 is "0000b", and the counter 403 performs count in accordance with lapse of time. The comparing circuit 405 compares the count value of the counter 403 and the random number stored in the random number storing part 1002, and when both of them coincide with each other, it outputs a coincidence signal to the transmitting part 407. When the transmitting part 407 inputs therein the above described coincidence signal, it transmits the acknowledge signal ACK including the ID stored in the ID storing part 406 to the master 131 through the antenna 401 by radio.

The communication device 121 in the first slave 111 and the communication device 122 in the second slave 112 differ from the communication device 123 in the third slave 113 in only the values stored in the ID storing parts 404 and the random number storing parts 1002. Since the random numbers differing from one another are stored in the random number storing parts 1002 in the first to the third slaves 111 to 113, the first to the third slaves 111 to 113 can transmit the acknowledge signals ACK in the different timings after receiving the same retransmission request signal REQ, and can prevent interference of the acknowledge signals ACK.

When the receiving part 402 receives the first request signal REQ as above, the comparing circuit 405 compares the counter value of the counter 403 and the ID stored in the ID storing part 404 by the same processing as in the first embodiment. When the receiving part 402 receives the retransmission request signal due to interference from the master 131 thereafter, the comparing circuit 405 compares the counter value of the counter 403 and the random number stored in the random number storing part 1002. Thereby, interference of the acknowledge signals ACK which are retransmitted can be prevented.

When the ID storing part 404 is deleted and the receiving part 402 receives the first request signal REQ, the comparing circuit 405 may compare the count value of the counter 403 and the random number stored in the random number storing part 1002, as when it receives the retransmission request signal REQ.

As above, according to the first to the seventh embodiments, the communication system has the master 131 and a plurality of slaves 111 to 113. Each of the slaves 111 to 113 has the receiving part 402 which receives by radio the same request signal REQ transmitted from the master 131 by radio, and the transmitting part 407 which transmits the acknowledge signal ACK to the master 131 in a different timing among the slaves 111 to 113.

More specifically, the communication devices 121 to 123 in the slaves 111 to 113 have the receiving parts 402 which receive the request signal REQ by radio, the counters 403 which start count of the count values on reception of the above described request signal REQ, the comparing parts 405 which compare the above described count values and the comparison values, and the transmitting parts 407 which transmit the acknowledge signals ACK by radio in accordance with the results of the above described comparison.

Thereby, the timings of the acknowledge signals ACK which a plurality of communication devices 121 to 123 (slaves 111 to 113) transmit by radio can be shifted, and therefore, collision of the acknowledge signals ACK can be prevented, thus making it possible to prevent interference. ID authentication of radio can be quickly performed accurately.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A communication device, comprising:
   a receiver unit configured to receive a request signal from a master by radio;
   a counter which begins changing a count value upon reception of the request signal from the master and the change in the count value corresponds to a lapse of time;
   a comparator unit configured to compare the count value and a comparison value of the communication device, the comparison value of the communication device being different from comparison values of other communication devices that receive request signals, which are the same with the request signal received by the receiver unit, from the master, respectively; and
   a transmitter unit configured to transmit an acknowledge signal to the master by radio at a different timing from a timing at which acknowledge signals are transmitted from the other communication devices in accordance with a result of the comparison.

2. The communication device according to claim 1, wherein the comparison value is all or a part of an identifier of the communication device.

3. The communication device according to claim 1, wherein the comparison value is a private key.

4. The communication device according to claim 3, further comprising a private key changer unit configured to change the private key.

5. The communication device according to claim 1, further comprising a register which stores the comparison value.

6. The communication device according to claim 5, further comprising a changer unit configured to change a comparison value in the register.

7. The communication device according to claim 1, further comprising an external terminal for receiving the comparison value from outside.

8. The communication device according to claim 1,
wherein the counter is configured to cyclically change the count value in accordance with an identifier of the communication device.

9. The communication device according to claim 1, further comprising a hash function part configured to output a hash value by a hash function based on an identifier of the communication device,
wherein the comparator unit is configured to perform comparison with the hash value as the comparison value.

10. The communication device according to claim 1, further comprising a random number generator unit configured to generate a random number,
wherein the comparator unit is configured to perform comparison with the random number as the comparison value.

11. The communication device according to claim 1, further comprising a random number generator unit configured to generate a random number,
wherein paid receiving part the receiver unit is configured to receive a retransmission request signal after receiving the request signal,
the counter begins changing a count value upon reception of the retransmission request signal,
the comparator unit compares the count value and the random number on reception of the retransmission request signal,
the transmitter unit is configured to transmit an acknowledge signal by radio in accordance with a result of the comparison, and
a value of the random number to be generated is different from the comparison value of the communication device.

12. The communication device according to claim 1,
wherein the transmitter unit is configured to transmit an acknowledge signal including an identifier of the communication device by radio.

13. A communication system, comprising:
a master; and
a plurality of slaves configured to communicate with the master,
wherein each of the slaves includes:
a receiver unit configured to receive a request signal from the master by radio;
a counter which begins changing a count value upon reception of the request signal from the master and the change in the count value corresponds to a lapse of time;
a comparator unit configured to compare the count value and a comparison value of a respective slave, the comparison value of the respective slave being different from comparison values of other slaves that receive request signals, which are the same with the request signal received by the receiver unit, from the master, respectively; and
a transmitter unit configured to transmit an acknowledge signal to the master by radio at a different timing from a timing at which acknowledge signals are transmitted from the other slaves in accordance with a result of the comparison.

14. The communication system according to claim 13,
wherein the comparison value is all or a part of an identifier of each respective slave.

15. The communication system according to claim 13,
wherein each of the slaves further comprises a register which stores the comparison value.

16. The communication system according to claim 13,
wherein each of the slaves has an external terminal for receiving the comparison value from outside.

17. The communication system according to claim 13,
wherein the counter is configured to cyclically change the count value in accordance with an identifier of each respective slave.

18. The communication system according to claim 13,
wherein each of the slaves further comprises a hash function part configured to output a hash value by a hash function based on the identifier of each respective slave, and
the comparator unit is configured to perform comparison with the hash value as the comparison value.

19. The communication system according to claim 13,
wherein each of the slaves further comprises a random number generator unit configured to generate a random number, and
the comparator unit is configured to perform comparison with the random number as the comparison value.

* * * * *